MINIMAL PIN MULTIPURPOSE LOGIC CIRCUITS

Filed Aug. 2, 1965 3 Sheets-Sheet 1

| | A | B | C | (NOR) 0 | 1 | 2 | 3 | (NAND) 127 | (AND) 128 | (OR) 254 |
|---|---|---|---|---|---|---|---|---|---|---|
| $ABC$ | 1 | 1 | 1 | 0 | 0 | 0 | 0 | 0 | 1 | 1 |
| $AB\bar{C}$ | 1 | 1 | 0 | 0 | 0 | 0 | 0 | 1 | 0 | 1 |
| $A\bar{B}C$ | 1 | 0 | 1 | 0 | 0 | 0 | 0 | 1 | 0 | 1 |
| $A\bar{B}\bar{C}$ | 1 | 0 | 0 | 0 | 0 | 0 | 0 | 1 | 0 | 1 |
| $\bar{A}BC$ | 0 | 1 | 1 | 0 | 0 | 0 | 0 | 1 | 0 | 1 |
| $\bar{A}B\bar{C}$ | 0 | 1 | 0 | 0 | 0 | 0 | 0 | 1 | 0 | 1 |
| $\bar{A}\bar{B}C$ | 0 | 0 | 1 | 0 | 0 | 1 | 1 | 1 | 0 | 1 |
| $\bar{A}\bar{B}\bar{C}$ | 0 | 0 | 0 | 0 | 1 | 0 | 1 | 1 | 0 | 0 |

10; 3; 7; 6

INVENTORS
DONALD C. FORSLUND
RONALD WAXMAN
BY
David W. Koppke
ATTORNEY

MINIMAL PIN MULTIPURPOSE LOGIC CIRCUITS

Filed Aug. 2, 1965 3 Sheets-Sheet 2

FIG.3

| | 0 | 1 | 2 | 3 | 4 | 5 | 6 | 7 |
|---|---|---|---|---|---|---|---|---|
| 0 | | $\bar{A}B\bar{C}$ 01t | $\bar{A}BC$ 01t | $\bar{A}B$1 01t | $\bar{A}\bar{B}C$ 01t | $\bar{A}C$1 01t | $\bar{A}\bar{B}C$ 02t | $B\bar{A}\bar{C}$ 04t |
| 10 | $\bar{A}\bar{B}C$ 01t | $\bar{A}BC$ 02t | $\bar{A}\bar{C}$1 01t | $B\bar{A}C$ 04t | $\bar{A}\bar{B}$1 01t | $\bar{B}\bar{A}\bar{C}$ 04t | $\bar{B}\bar{A}C$ 04t | $\bar{A}$01 01t |
| 20 | $AB\bar{C}$ 01t | $\bar{B}C$1 01t | $\bar{B}\bar{A}C$ 02t | $A\bar{B}\bar{C}$ 04t | $\bar{C}\bar{A}B$ 02t | $A\bar{C}B$ 04t | $AB\bar{C}$ 05t | $\bar{B}\bar{A}C$ 07c |
| 30 | $AB\bar{C}$ 03t | $\bar{A}B\bar{C}$ 06t | $\bar{B}AC$ 06t | $AC\bar{B}$ 09t | $\bar{C}AB$ 06t | $AB\bar{C}$ 09t | $\bar{B}\bar{C}A$ 08c | $\bar{B}AC$ 04c |
| 40 | ABC 01t | $\bar{B}AC$ 02t | $\bar{B}\bar{C}$1 01t | $A\bar{B}C$ 04t | ABC 03t | $\bar{B}A\bar{C}$ 06t | $\bar{A}BC$ 06t | $BC\bar{A}$ 09t |
| 50 | $C\bar{A}B$ 02t | ABC 05t | $AC\bar{B}$ 04t | $\bar{B}\bar{A}C$ 07c | CAB 06t | $C\bar{B}A$ 08c | $\bar{A}\bar{B}C$ 09c | $\bar{B}\bar{A}C$ 04c |
| 60 | AB1 01t | $\bar{A}\bar{B}\bar{C}$ 04t | $\bar{A}\bar{B}C$ 04t | $\bar{B}$01 01t | $\bar{C}\bar{A}\bar{B}$ 06t | $BA\bar{C}$ 09t | $\bar{A}\bar{C}B$ 08c | $\bar{A}BC$ 04c |
| 70 | $C\bar{A}\bar{B}$ 06t | $C\bar{A}B$ 08c | $\bar{B}A\bar{C}$ 09c | $\bar{A}B\bar{C}$ 04c | 1AB 02c | $C\bar{A}B$ 06c | $\bar{C}\bar{A}B$ 06c | $A\bar{B}$1 01c |
| 100 | $A\bar{B}\bar{C}$ 01t | $\bar{C}AB$ 02t | $\bar{A}BC$ 03t | $\bar{C}A\bar{B}$ 06t | BC1 01t | $A\bar{C}B$ 04t | $\bar{A}\bar{B}\bar{C}$ 06t | $CB\bar{A}$ 09t |
| 110 | $B\bar{A}C$ 02t | $A\bar{B}\bar{C}$ 05t | BAC 06t | $B\bar{C}A$ 08c | $AB\bar{C}$ 04t | $B\bar{A}C$ 07c | $\bar{A}C\bar{B}$ 09c | BAC 04c |
| 120 | AC1 01t | $\bar{A}\bar{C}B$ 04t | $\bar{B}\bar{A}\bar{C}$ 06t | $CA\bar{B}$ 09t | $\bar{A}\bar{C}B$ 04t | $\bar{C}$01 01t | $\bar{A}\bar{B}C$ 08c | $\bar{B}CA$ 04c |
| 130 | $B\bar{A}\bar{C}$ 06t | $B\bar{A}C$ 08c | 1AC 02c | $B\bar{A}C$ 06c | $\bar{C}A\bar{B}$ 09c | $\bar{A}C\bar{B}$ 04c | $\bar{B}\bar{A}C$ 06c | $A\bar{C}$1 01c |
| 140 | $A\bar{B}C$ 02t | $\bar{A}\bar{B}\bar{C}$ 05t | ABC 06t | $A\bar{C}B$ 08c | $A\bar{B}\bar{C}$ 06t | $A\bar{B}C$ 08c | 1BC 02c | $A\bar{B}C$ 06c |
| 150 | $\bar{A}\bar{B}C$ 05t | ABC 10t | ABC 08t | $\bar{A}\bar{B}\bar{C}$ 05c | ACB 08t | $\bar{A}BC$ 05c | $AB\bar{C}$ 06c | ABC 02c |
| 160 | $BA\bar{C}$ 04t | $\bar{B}AC$ 07c | $\bar{B}C\bar{A}$ 09c | ABC 04c | $A\bar{B}C$ 09c | ACB 04c | $\bar{A}\bar{B}C$ 06c | $B\bar{C}$1 01c |
| 170 | BCA 08t | $A\bar{B}C$ 05c | $BA\bar{C}$ 06c | BAC 02c | $CA\bar{B}$ 06c | CAB 02c | $A\bar{B}C$ 03c | $A\bar{B}C$ 01c |
| 200 | $A\bar{B}C$ 01t | $A\bar{B}C$ 03t | CAB 02t | $CA\bar{B}$ 06t | BAC 02t | $BA\bar{C}$ 06t | $A\bar{B}C$ 05t | BCA 08c |
| 210 | $B\bar{C}$1 01t | $\bar{A}\bar{B}C$ 06t | ACB 04t | $A\bar{B}C$ 09t | ABC 04t | $\bar{B}C\bar{A}$ 09t | $\bar{B}AC$ 07t | $BA\bar{C}$ 04c |
| 220 | ABC 02t | $AB\bar{C}$ 06t | $\bar{A}BC$ 05t | ACB 08c | $\bar{A}\bar{B}\bar{C}$ 05t | ABC 08c | ABC 10c | $\bar{A}\bar{B}C$ 05c |
| 230 | $A\bar{B}C$ 06t | 1BC 02t | $A\bar{B}C$ 08t | $A\bar{B}\bar{C}$ 06c | $A\bar{C}B$ 08t | ABC 06c | $\bar{A}\bar{B}\bar{C}$ 05c | $A\bar{B}C$ 02c |
| 240 | $A\bar{C}$1 01t | $\bar{B}\bar{A}C$ 06t | $\bar{A}\bar{C}B$ 04t | $\bar{C}AB$ 09t | $B\bar{A}C$ 06t | 1AC 02t | $B\bar{A}C$ 08t | $\bar{B}\bar{A}\bar{C}$ 06c |
| 250 | $\bar{B}CA$ 04t | $\bar{A}\bar{B}C$ 08t | $\bar{C}$01 01c | $\bar{A}\bar{C}B$ 04c | $CA\bar{B}$ 09c | $\bar{B}\bar{A}\bar{C}$ 06c | $\bar{A}\bar{C}\bar{B}$ 04c | AC1 01c |
| 260 | BAC 04t | $\bar{A}C\bar{B}$ 09t | $B\bar{A}C$ 07t | $AB\bar{C}$ 04c | $B\bar{C}A$ 08t | BAC 06c | $A\bar{B}\bar{C}$ 05c | $B\bar{A}C$ 02c |
| 270 | $CB\bar{A}$ 09c | $\bar{A}\bar{B}\bar{C}$ 06c | $A\bar{C}B$ 04c | BC1 01c | $\bar{C}A\bar{B}$ 06c | $\bar{A}BC$ 03c | $\bar{C}AB$ 02c | $A\bar{B}C$ 01c |
| 300 | $A\bar{B}$1 01t | $\bar{C}\bar{A}B$ 06t | $C\bar{A}B$ 06t | 1AB 02t | $\bar{A}B\bar{C}$ 04t | $\bar{B}A\bar{C}$ 09t | $C\bar{A}B$ 08t | $C\bar{A}\bar{B}$ 06c |
| 310 | $\bar{A}BC$ 04t | $\bar{A}\bar{C}B$ 08t | $BA\bar{C}$ 09c | $\bar{C}\bar{A}\bar{B}$ 06c | $\bar{B}$01 01c | $\bar{A}\bar{B}C$ 04c | $\bar{A}\bar{B}\bar{C}$ 04c | AB1 01c |
| 320 | $\bar{B}A\bar{C}$ 04t | $\bar{A}B\bar{C}$ 09t | $C\bar{B}A$ 08t | CAB 06c | $\bar{B}\bar{A}\bar{C}$ 07t | $AC\bar{B}$ 04c | ABC 05c | $C\bar{A}B$ 02c |
| 330 | $BC\bar{A}$ 09c | $\bar{A}BC$ 06c | $\bar{B}A\bar{C}$ 06c | ABC 03c | $A\bar{B}C$ 04c | $\bar{B}\bar{C}$1 01c | $\bar{B}AC$ 02c | ABC 01c |
| 340 | $\bar{B}AC$ 04t | $\bar{B}\bar{C}A$ 08t | $AB\bar{C}$ 09c | $\bar{C}AB$ 06c | $AC\bar{B}$ 09c | $\bar{B}AC$ 06c | $\bar{A}B\bar{C}$ 06c | $AB\bar{C}$ 03c |
| 350 | $\bar{B}\bar{A}C$ 07t | $AB\bar{C}$ 05c | $A\bar{C}\bar{B}$ 04c | $\bar{C}\bar{A}B$ 02c | $A\bar{B}\bar{C}$ 04c | $\bar{B}\bar{A}C$ 02c | $\bar{B}C$1 01c | $AB\bar{C}$ 01c |
| 360 | $\bar{A}$01 01c | $\bar{B}AC$ 04c | $\bar{B}\bar{A}\bar{C}$ 04c | $\bar{A}\bar{B}$1 01c | $B\bar{A}C$ 04c | $\bar{A}\bar{C}$1 01c | $\bar{A}BC$ 02c | $\bar{A}\bar{B}C$ 01c |
| 370 | $B\bar{A}\bar{C}$ 04c | $\bar{A}\bar{B}C$ 02c | $\bar{A}C$1 01c | $\bar{A}\bar{B}C$ 01c | $\bar{A}\bar{B}$1 01c | $\bar{A}BC$ 01c | $\bar{A}B\bar{C}$ 01c | |

PIN CONNECTIONS

| EQUIVALENCE CLASS | 30 | 31 | 32 | 33 | 65 |
|---|---|---|---|---|---|
| 1 | V2 | V1 | V1 | V3 | 0 |
| 2 | V2 | 0 | V1 | V3 | 0 |
| 3 | V1 | V1 | V2 | V3 | 0 |
| 4 | V1 | V2 | 0 | V3 | 0 |
| 5 | V1 | V2 | 1 | V3 | 0 |
| 6 | V2 | V3 | V2 | V1 | 0 |
| 7 | V2 | 1 | V1 | V3 | 0 |
| 8 | V2 | V3 | V1 | 1 | 0 |
| 9 | V1 | V3 | V2 | V3 | 0 |
| 10 | V1 | V2 | 1 | V3 | 1 |

United States Patent Office 3,381,117

Patented Apr. 30, 1968

3,381,117

MINIMAL PIN MULTIPURPOSE LOGIC CIRCUITS

Donald C. Forslund, Wappingers Falls, and Ronald Waxman, Poughkeepsie, N.Y., assignors to International Business Machines Corporation, Armonk, N.Y., a corporation of New York Filed Aug. 2, 1965, Ser. No. 476,602

9 Claims. (Cl. 235—164)

ABSTRACT OF THE DISCLOSURE

The invention is a logic circuit for performing 254 out of a possible 256 logic functions of three variables; the inputs of said circuit consisting of either the true or complement of each of the three variables and a constant bias level. Each of the logic blocks is used in more than one configuration; a configuration being the circuit arrangement selected by the constant bias level. A second embodiment performing all 256 logic functions is also shown. Both circuits are shown employing NAND logic.

This invention relates to logic circuitry, and more particularly to a multipurpose logic circuit capable of performing a plurality of functions of three variables.

Multipurpose logic circuits, i.e., circuits capable of performing more than a single discrete logical function, have been known for years. Nevertheless, these circuits have not experienced widespread use in the data processing industry due to the fact that specially designed circuits have been found more economical. With present-day technologies, however (e.g. monolithic integrated circuits) the expense of the actual circuit components has become the least important factor. Thus, it is no longer the cost of the single circuit component which becomes important, but rather the cost of processing steps which are required to produce the circuit and its myriad of components. In other words, whether a specific circuit with several circuit components or a plurality of circuits with many circuit components is produced, the cost is substantially the same, since both can be produced by the same integrated circuit processing steps. For these reasons, it has become apparent that the economic rationale for not using multipurpose circuitry is no longer valid.

Presently, one of the most significant problems in the fabrication of integrated circuits is the fact that while the circuits can be made which will perform desired functions, the ability to communicate with these circuits via pins or connectors is greatly limited by their minute physical size. Thus, it is desirable in the production of such circuits to minimize pin connections while maximizing circuit capabilities.

In U.S. Patent 3,028,088 to B. Dunham, assigned to the same assignee as this application, a universal logic module is described which utilizes interconnections of binary full adders to provide the multipurpose logic function. No significant attempt is made in the Dunham patent to minimize the connections to the circuitry nor the number of circuits required to perform the multipurpose logic function.

It is therefore an object of this invention to provide a multipurpose type of information handling circuit.

Another object of this invention is to provide a logical building block capable of achieving a multiplicity of logical connectors for a given information system.

Still another object of this invention is to provide an information handling circuit wherein the greatest logic generality can be achieved.

And yet another object of this invention is to provide multipurpose logical circuits having minimum required external connections.

In accordance with the above stated objects, a multipurpose logical circuit with only 6 communicating signal connections is provided which is capable of performing 254 out of 256 discrete logical combinations of three variables. The multipurpose circuit includes 9 discrete circuits and is provided with 4 signal inputs and true and complement outputs. Through the ability to permute any of the three variables to any of the 4 inputs to the logical circuit in either the true or complement form and to additionally provide preset bias levels to any of the circuit's inputs, the multipurpose logic circuit is enabled to carry out the above stated large number of unique logical functions.

A slightly more complex logic circuit containing 10 discrete circuits, 5 signal inputs and 2 outputs is also described which is capable of providing all functions of three variables.

In copending U.S. patent application Ser. No. 476,397 entitled "Multipurpose Logic Circuit" and assigned to the same assignee as this application, a multipurpose logical circuit capable of performing 254 out of 256 functions of three variables is disclosed, wherein the number of discrete logic circuits is minimized rather than the number of communicating circuit connections.

The foregoing and other objects, features and advantages of the invention will be apparent from the following more particular description of the preferred embodiment of the invention, as illustrated in the accompanying drawings:

FIG. 3 is a chart which describes all functions of three variables.

Figures 1, 2:
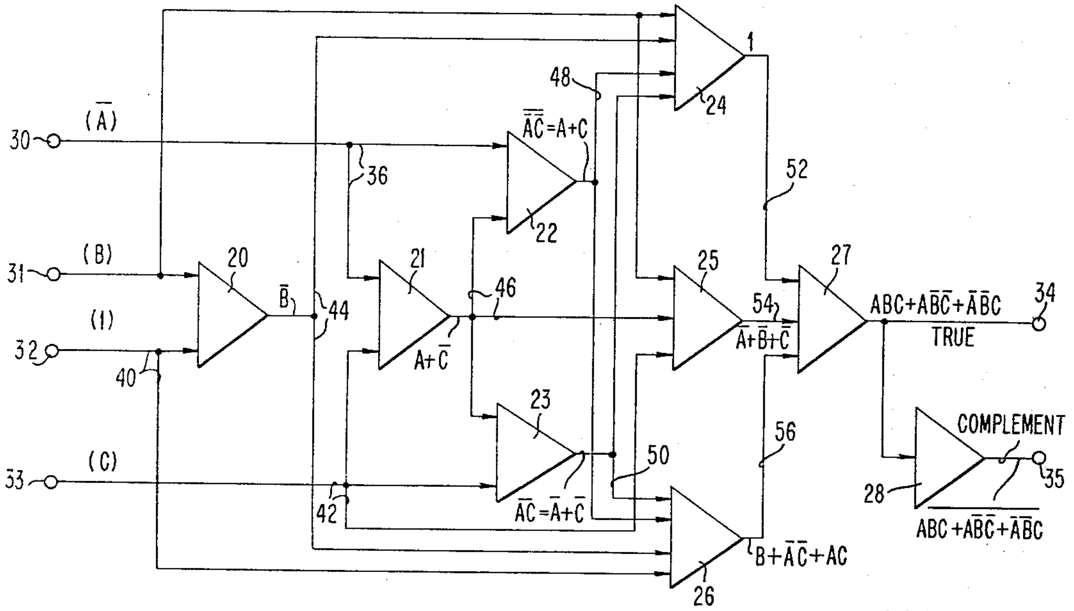
FIG. 1 is a truth table showing some of the functions of three variables.
FIG. 2 is the logic circuit which embodies the invention and is adapted to perform 254 out of 256 functions of three variables.

Referring now to FIG. 1, a truth table is shown in which three input variables, A, B and C, are present in all possible combinatorial arrangements. While it has been shown that there are 256 unique combinations of three variables, only a few are shown in FIG. 1 for explanatory purposes. Each function occupies a column of the chart to the right of line 10 and is designated by the decimal equivalent of the binary value of the function. Thus, under decimal column 1, the binary number (00000001) is seen. Likewise, under column 127 appears its binary equivalent (01111111). Certain of the functions shown in FIG. 1 have found widespread use in the data processing field and are indicated by the titles in parenthesis above the columns. Thus, the function shown in column 1 is the well-known NOR function while the function in column 128 is the well-known AND function. Columns 127 and 254 respectively show the NAND and OR functions.

Others, in studying the functions of a plurality of variables and in particular, three variables, have found that certain subsets of these functions exhibit likeness (e.g. see the following articles by Dr. Leo Hellerman: an article entitled, "Equivalence Classes of Logic Functions," which appeared in the magazine "Computer Design," Vol. 1, No. 1, 1962, at pp. 34–37; and "A Catalogue of Three Variable OR-Invert and AND-Invert Logical Circuits," Electronic Computer Transactions of IEEE, June 1963, at pp. 198–200). What has been determined is that a logical circuit capable of generating a specific one of the 256 logical combinations of three variables in response to inputs of the true form of the input variables, can also generate additional ones of the 256 logical functions by allowing the input variables to be interchanged or permuted between the circuit's input terminals. The same circuit has been shown to be capable of generating even more of the 256 logical functions of three variables if complements of the variables are available at the input terminals, and a complement of the logical function output is provided. By still further providing logically constant bias levels in addition to the aforesaid true and complement inputs, even more of the logical functions can be provided from the same circuit. Discrete functions which exhibit this ability to be derived from a single logic circuit have been grouped into "equivalence classes."

By referring back to FIG. 1, the concept of an equivalence class will be better understood. To demonstrate that the NOR, NAND, AND, and OR logical functions all fall within the same equivalence class, one must merely take a circuit which performs one of these functions and provide both true and complement forms of the input variables and true and complement forms of the circuit's logical output. As an example, assume an AND circuit which provides both true and complement outputs. By definition its true output will only provide an UP level when the input condition $A=1$, $B=1$, and $C=1$ occurs. Since the NAND function is the direct complement of the AND function, the complement output of the AND circuit will at all times reflect the NAND function. It is further well known, that any logic circuit which performs the AND function in positive logic, performs the OR function with complementary logic. Thus, all that is required to compel the exemplary AND circuit to perform the logical "OR" function is to complement each of the logical inputs and take the circuit's output from the complement output. As an example, assume the OR function of A, $\overline{B}$, $\overline{C}$ i.e. $(A+\overline{B}+\overline{C})$ is desired from the AND circuit. The actual variable inputs to the AND circuit are $\overline{A}$, B, C. With these inputs (assuming $A=1$, $B=1$, $C=1$), the true output of the AND circuit remains at the DOWN logical level, and its complement output is at the UP level as it should be for the OR function $A+\overline{B}+\overline{C}$. This example can be extended to the NOR logical function which through a similar analysis can be shown to occur at the true output of the AND circuit when the complement of the input variables are utilized.

In previous studies, it has been shown that by utilizing only the true form of the input variables, the 256 logical functions of three variables can be partitioned into 80 equivalence classes. That is, all functions in the same equivalence class may be obtained from the same circuit by merely permuting the input variables. When both the true and complement value of each variable is made available at the input to the circuit, the number of equivalence classes reduces to 22. The number of equivalence classes can further be reduced to 14 if the true and inverse form of the logic output is made available from the logic circuit. Four of these 14 classes are found to be degenerate, in that they are functions of one or two variables and may be obtained from certain of the nondegenerate equivalence classes by applying predetermined logical levels (biasing) to one or more of the logic circuits' input terminals or by connecting one or more variables to more than one input terminal. Hence, the 256 functions of three variables have been shown to reduce to ten equivalence classes and are obtainable from ten discrete circuits, providing true and complement inputs and outputs, permutation of inputs, and biasing are available.

While circuits have been suggested to perform one or more of the 10 equivalence classes of three variables, no circuits are known which with aminimum of communicating signal pins will perform either all or substantially all of the 10 equivalence classes. The circuit shown in FIG. 2 will perform 9 out of the 10 equivalence classes and as a result, 254 out of 256 functions of three variables utilizing only 6 signal pins. The tenth equivalence class encompasses the Exclusive OR function of three variables and its complement and requires the additional circuitry shown in FIG. 5. In our copending application Ser. No. 476,397 a 6 circuit multipurpose logic circuit is described which will perform a like number of logical functions of three variables as the circuit of FIG. 2, but which requires 9 pins versus the 6 pins of FIG. 2.

Referring now to FIG. 2, each of logic blocks 20–28 is identical and is required to provide a logical inversion between its inputs and output. Other than this restriction, any of a number of well-known logic circuits can be utilized in the circuit of FIG. 2 (e.g. NOR, NAND). A preferred circuit is the NAND circuit which logically provides UP level outputs except when the UP levels of the input variables are simultaneously present, at which time it produces a DOWN output. NAND circuits are well-known in the art and exemplary types may be found in "Handbook of Semiconductor Electronics," by L. Hunter at page 15–59 (second edition—1962) published by McGraw-Hill.

Inputs to the circuit of FIG. 2 may be supplied through any of input terminals 30–33 while true and complement outputs are taken from terminals 34 and 35 respectively. Input terminal 30 is connected via conductors 36 to the inputs of NAND circuits 21 and 22 while input terminal 31 is connected to NAND circuits 20, 24 and 25 via conductors 38. Terminal 32 is connected via conductors 40 to NAND circuits 20 and 26, and input terminal 33 is connected via conductors 42 to NAND circuits 21, 23 and 25. The output of NAND circuit 20 is coupled to NAND circuits 24 and 26 via conductors 44 and the output of NAND circuit 21 is connected via conductors 46 to inputs to NAND circuits 22, 23 and 25. The outputs of NAND circuits 22 and 23 are both connected via conductors 48 and 50 to inputs to NAND circuits 24 and 26. The outputs from NAND circuits 24, 25 and 26 are respectively applied via conductors 52, 54, and 56 to NAND circuit 27 whose output, in turn, is applied to terminal 34 as the true output of the multipurpose logic circuit. The true output from NAND circuit 27 is inverted by NAND circuit 28 and is applied to terminal 35 to provide a complement output. To determine what inputs must be provided to which terminals in the circuit of FIG. 2 to assure a desired output function at one of terminals 34 or 35, reference must be made to the charts of FIG. 3 and 4. An octal notation has been adopted to simplify identification of each of the functions of three variables. In brief, each of the 8 bit binary numbers which designates a particular function has been divided into three octal segments and corresponding octal numbers assigned to these segments. For instance, the octal designator for the OR function shown in FIG. 1 is 376 with the 6, or least significant octal digit being obtained from the decimal value of the three least significant binary digits 110; the 7 from the next three significant digits 111; and the 3 from the two most significant digits of the binary function number 11. Using this technique, it can be seen that the octal designator for the AND function is 200 and for the NAND function is 177 etc.

FIG. 3 uses this notation and tabulates each of the 256 discrete functions of three variables in accordance with its corresponding octal designator, with the designator of each function being found on the horizontal and vertical axes of the chart. The group of characters found at the intersection of any two of these numbers indicates (1) the true or complement status and order of the variable inputs to the logic circuit of FIG. 2 (the significance of which will be discussed in greater detail hereinafter), (2) the equivalence class to which the specifically designated function belongs, and (3) whether the true or complement output of the circuit of FIG. 2 provides the desired function. More particularly, when a specific intersection in the chart of FIG. 3 is found which corresponds to the octal number of the function, the first three characters of the expression are indicative of the three variables V1, V2, V3 to be applied to the circuit of FIG. 2. Upper case letters (e.g. A, B, C) indicate true inputs while barred letters ($\overline{A}$, $\overline{B}$, $\overline{C}$) indicate that the complemented form of the input should be applied. If the numeral one or zero appears as one of the first three characters, this indicates that a bias level corresponding to the "1" logical level or "0" logical level must be applied. The order in which the first three characters of the expression appear, further indicates the correspondence of the respective variables A, B, and C to the variable inputs V1, V2, and V3 of the circuit of FIG. 2 (To determine exactly where the variable inputs V1, V2, and V3 must be applied will be shortly discussed in relation to the chart of FIG. 4.) The next two characters of the chart indicate to which of the equivalence classes the specific logical function belongs, and the final character (*t* or *c*) indicates whether the function is derived from true output 34 or complement output 35.

Once reference is made to the chart of FIG. 3 to determine the identity of a particular function's equivalence class, chart 4 can then be examined to determine the specific inputs which must be applied to the circuit of FIG. 2 to provide the desired function output. The vertical axis of the chart of FIG. 4 has noted thereon each of the equivalence classes and the specific circuit terminal numbers are denoted along the horizontal axis. At each intersection is indicated the specific variable input (V1, V2, V3) or logical bias which must be applied to the noted terminal. The row which corresponds to equivalence class 10 and the column corresponding to terminal 65 are only applicable to the circuit of FIG. 5 and will be hereinafter discussed with respect thereto.

Referring now to the truth table of FIG. 1 in combination with the charts of FIGS. 3 and 4, an example will be described to explain the operation of the multipurpose logic circuit of FIG. 2. Assume that the function $ABC+A\overline{BC}+\overline{AB}C$ must be implemented. The function is first set up in the form of a truth table, such as that shown in FIG. 1, and its binary equivalent is derived. In this case, the binary number which describes the function is 10010010 (noting that 1's appear only opposite the functions $ABC$, $\overline{AB}C$, $A\overline{BC}$). The corresponding octal number is then derived from the binary number in the manner aforedescribed. In this case, the octal equivalent of 10,010,010 is 222. To determine to which equivalence class function 222 belongs and the state of the logical inputs to be applied to the circuit of FIG. 2, requires that the chart of FIG. 3 be examined. The expression giving the aforementioned data is found at the intersection of the 220 line (on the horizontal axis) and the 2 line (on the vertical axis). The expression thus derived is $\overline{A}$BC05*t*. The first three characters i.e. $\overline{A}$BC, indicate that the true values of variables of B and C and the complemented value of variable A must be applied to the circuit of FIG. 2 and that $\overline{A}$, B, and C respectively correspond to variables V1, V2, and V3. The next two numbers i.e. 05, indicates that the specific function belongs to the fifth equivalence class and provides the desired entry into the chart of FIG. 4. The last character i.e. *t*, indicates that the desired function can be derived from the true output (terminal 34) of the circuit of FIG. 2.

Figures 4, 5:
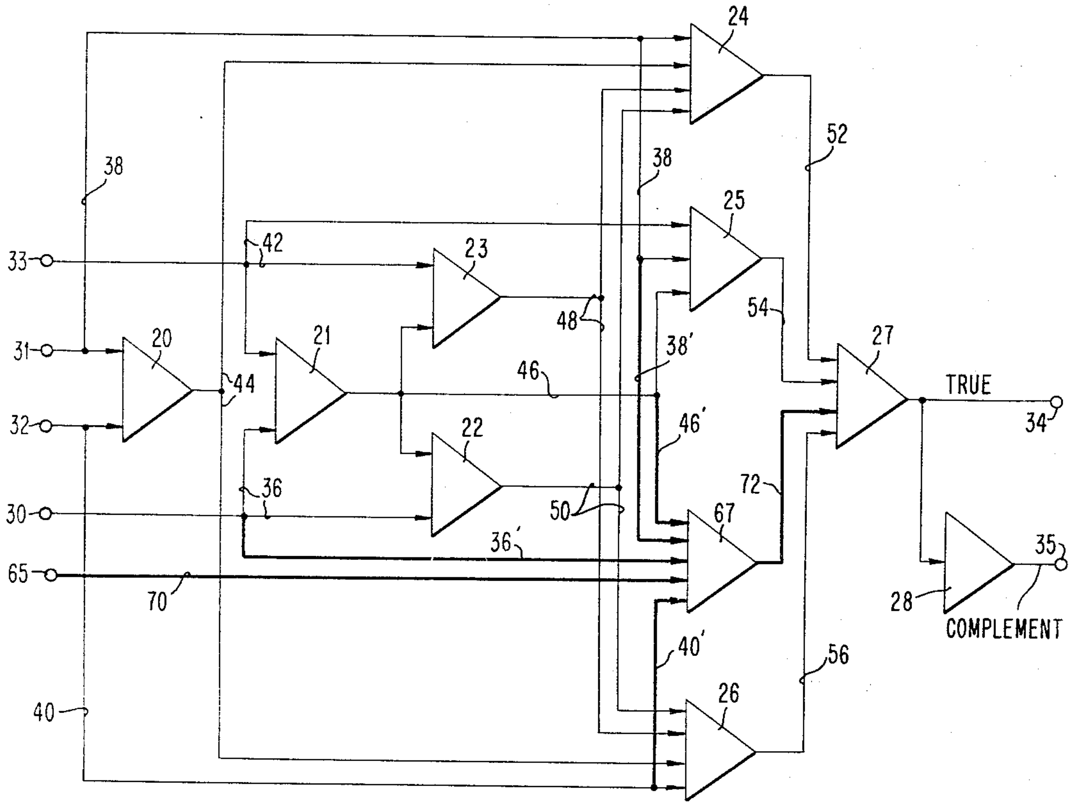
FIG. 4 is a chart which describes all of the connections required to allow the circuits of FIGS. 2 and 5 to perform their functions.
FIG. 5 is a logic circuit which embodies the invention and is capable of performing all functions of three variables.

Reference is now made to the chart of FIG. 4 and, in specific, to the horizontal line which relates to equivalence class 5. Upon this line, can be found the pin connections required to allow the circuit of FIG. 2 to perform its desired logical function. In the circuit of FIG. 2, the connections required by the chart of FIG. 4 are illustrated in parenthesis next to their respective terminals. Variable V1 ($\overline{A}$) is applied to terminal 30 and variable V2 (B) is applied to terminal 31. A constant "1" level bias is applied to terminal 32, and the third variable V3 (C) is applied to terminal 33. At the output of each of the NAND circuits 20–28 is denoted the logic expression resulting from its inputs. As can be seen by the logical expression at the output of NAND circuit 27, the desired logic output is achieved.

To further illustrate the operation of the circuit of FIG. 2, assume that each of variables A, B, and C is at the UP or "1" level (ABC). UP level potentials corresponding to variables B and C will be applied to terminals 31 and 33 and a DOWN level potential corresponding to $\overline{A}$ will be applied to terminal 30. A constant UP level corresponding to a "1" bias will be applied to terminal 32. The $\overline{A}$ DOWN level potential on terminal 30 will be transmitted to NAND circuits 21 and 22 via conductors 36 and will force those circuits to produce UP level outputs on conductors 46 and 48 respectively. The application of the UP levels corresponding to the B and 1 inputs will force the output of NAND circuit 20 to the DOWN level. This DOWN level output will be fed via conductors 44 to force up level outputs from NAND circuits 24 and 26. The inputs to NAND circuit 25 are respectively the UP level on conductor 46, the UP level resulting from the B input on conductor 38 and the UP level on conductor 42 due to the C input. NAND circuit 25 is thereby fully conditional and produces a DOWN level on conductor 54 which forces the output of NAND circuit 27 to the UP level, thereby indicating the desired logical condition at terminal 34–(ABC).

A similar exercise will show that if logical conditions corresponding to $A\overline{BC}$ or $\overline{AB}C$ are applied to the input terminals to the circuit (as modified in accordance with the chart of FIG. 3) UP level outputs will appear at terminal 34 and the complement will appear at terminal 35.

If it is determined that a logical function of less than three variables is required, a bias input to one or more of the input terminals to the circuit of FIG. 2 must be applied. Function 300 (chart of FIG. 3) is such a function-A$\overline{B}$101*t*. From an examination of the chart of FIG. 4 (equivalence class 1) it can been that the 1 bias level corresponds to V3 and is applied to terminal 33. A and $\overline{B}$ are respectively applied to terminals 31, 32 (V1) and 30 (V2).

As aforementioned, the circuit of FIG. 2 is capable of providing 254 out of 256 functions of three variables. To perform the entire 256 functions of three variables requires that an additional input terminal and logic circuit be added to the circuit of FIG. 2. This addition is shown in FIG. 5 and comprises additional input terminal 65 and NAND circuit 67. Added inputs required for NAND circuit 67 are shown by darker lines and include conductors 36′, 38′, 40′, and 46′. Input terminal 65 is connected to an input to NAND circuit 67 via conductor 70 and the output of NAND circuit 67 is fed into NAND circuit 27 via conductor 72.

NAND circuit 67 comes into play only in the performance of the tenth equivalence class which is the Exclusive OR function of three variables and its complement. The Exclusive OR function of three variables is logically expressed as $ABC+A\overline{BC}+\overline{A}B\overline{C}+\overline{AB}C$. The complement of this function is $\overline{ABC}+AB\overline{C}+A\overline{B}C+\overline{A}BC$. While the circuit of FIG. 2 will provide three of the terms showns shown for the Exclusive OR function, it is incapable of providing the fourth term and NAND circuit 67 provides this capability. To illustrate the operation of the circuit of FIG. 5 when it is required to produce, the complement of the Exclusive OR function, $$(\overline{ABC}+AB\overline{C}+A\overline{B}C+\overline{A}BC)$$

the function is first converted to its octal equivalent in the afore-described manner (01, 101, 001=151). Reference is then made to the chart of FIG. 3 to determine the equivalence class, state and order of the input variables, and which output of the circuit of FIG. 5 provides the desired logic output. The function found is ABC10*t* which indicates that each of the variables is applied in its true form (and correspond in their indicated order to V1 (A), V2 (B), and V3 (C)); that this function is in equivalence class 10, and that the desired output is derived from true output terminal 34. Reference is then made to the chart of FIG. 4 to determine the specific connections of the circuit of FIG. 5 to provide the complemented Exclusive OR function.

If it is assumed that A and B are at the UP level while C is at the DOWN level (the input condition required to make the term $AB\overline{C}=1$), it can be seen from the row corresponding to equivalence class 10 in the chart of FIG. 4, that terminals 30, 31 and 32 have UP levels applied thereto while terminal 33 has a DOWN level applied. The UP inputs on terminals 31 and 32 fully condition NAND circuit 20 to produce a DOWN output on conductors 44, which DOWN output forces NAND circuits 24 and 26 to produce UP outputs on their respective output conductors 52 and 56. The application of the DOWN level to terminal 33 is transmitted to NAND circuit 25 via conductor 42 and forces it to produce an UP output on its output conductor 54. The UP level inputs on terminals 31 and 32 are also respectively fed via conductors 38, 38' and 40, 40' to partially condition NAND circuit 67. The UP levels on terminals 30 and 65 are fed via conductors 36' and 70 respectively to NAND circuit 67. The only remaining input to NAND circuit 67 is derived from NAND circuit 21 which, due to the DOWN and UP logic levels applied by terminals 30 and 33 thereto, produces an UP level output and fully conditions NAND circuit 67. This causes a DOWN level output to be applied via conductor 72 to NAND circuit 27 thereby forcing it to produce an UP output to terminal 34 thereby indicating the fact that thte logical conditions corresponding to that term of the complement of the Exclusive OR function ($AB\overline{C}$) is present at the input terminals.

To illustrate the operation of this circuit when the Exclusive OR function occurs, the same process as for the complement of the Exclusive OR must be followed—i.e. conversion to octal designation and references to the charts of FIGS. 3 and 4. In this case it will be found that the octal designation of the Exclusive OR function is 226, that the function is in equivalence class 10 and that the output will be derived from complement output terminal 35. Assume that the variables A and B are at the DOWN level while variable C is at the UP logical level ($\overline{AB}C$). From the chart of FIG. 4, UP logical levels will be applied to terminals 32 and 33 while DOWN logical levels are applied to terminals 30 and 31. The DOWN logical level on terminal 31 will be transmitted to NAND circuits 24, 25, and 67 via conductors 38 and 38' to thereby force the outputs of these NAND circuits to the UP level. The input on terminal 30 will, via conductor 36, force NAND circuit 21 to produce an UP level output which will partially condition NAND circuit 22 via conductor 46. The UP level on conductor 33 will fully condition NAND circuit 22 to produce a DOWN logical level on its output conductor 48. This DOWN logical level will force NAND circuit 26 to produce an UP logical output on conductor 56 and fully condition NAND circuit 27 to produce a DOWN output. The DOWN output will be inverted in NAND circuit 28 to an UP logical level and be applied to terminal 35 indicating that the conditions for one term of the Exclusive OR function are present at the inputs.

While the invention has been particularly shown and described with reference to a preferred embodiment thereof, it will be understood by those skilled in the art that the foregoing and other changes in form and details may be made therein without departing from the spirit and scope of the invention.

We claim:

1. In a multipurpose logic circuit capable of providing at least 254 out of 256 logical functions of three variables, the combination comprising:

first, second, third, fourth, fifth, sixth, seventh, eighth and ninth inverting logic circuits;

first, second, third, and fourth input terminals; each said input terminal adapted to receive the true or complement form of any of said three variables or a constant bias level;

circuit means connecting said first input terminal to said second and third inverting logic circuits, said second input terminal to said first, fifth, and sixth inverting logic circuits, said third input terminal to said first and seventh inverting logic circuits, and said fourth input terminal to said second, fourth, and sixth inverting logic circuits;

additional circuit means connecting the output from said first inverting logic circuit to inputs to said fifth and seventh inverting logic circuits, the output from said second inverting logic circuit to inputs of said third, fourth and sixth inverting logic circuits, the outputs of said third and fourth logic circuits to inputs to said fifth and seventh inverting logic circuits, the outputs of said fifth, sixth, and seventh inverting logic circuits to inputs to said eighth inverting logic circuits, and the output of said eighth inverting logic circuit to the input of said ninth inverting logic circuit;

first and second output terminals connected to the outputs of said eighth and ninth logic circuits respectively, said first and second output terminals providing true and complement outputs for said logic circuit.

2. The multipurpose logic circuit defined in claim 1 wherein said inverting logic circuits are NAND circuits.

3. The multipurpose logic circuit defined in claim 1 wherein said inverting logic circuits are NOR circuits.

4. The multipurpose logic circuit defined in claim 1, wherein the equivalence classes for specific functions, the order of the input variables and the desired output terminal wherein the function will appear is determined by reference of the chart of FIG. 3 via the specific function's octal designator and the inputs to said first through fourth input terminals are determined from the chart of FIG. 4.

5. The multipurpose logic circuit as defined in claim 1 further comprising:

a tenth inverting logic circuit;

a fifth input terminal connected to an input to said tenth inverting logic circuits;

circuit means connecting said second, third, and fourth input terminals and the output of said second inverting logic circuit to inputs to said tenth logic circuit, the output of said tenth inverting logic circuit being connected to an input to said eighth inverting logic circuit;

whereby said multipurpose logic circuit is rendered capable of providing 256 functions of three variables.

6. In a multipurpose logic circuit capable of providing a plurality of logical functions of three variables, said plurality of logical functions including more than one equivalence class, the combination comprising:

a plurality of logic gates each having an input and an output;

a plurality of input terminals;

means for applying to each said input terminal either the true or complement form of any of said three variables or a constant bias level;

circuit means connecting a first input terminal to the inputs of at least two of said logic gates, a second input terminal to the inputs of at least three of said logic gates, a third input terminal to the inputs of at least two of said logic gates, and a fourth input terminal to the inputs of at least three of said logic gates;

additional circuit means connecting the output of one of said logic gates to the inputs of at least two of said logic gates, the output of another of said logic gates to the inputs of at least three of said logic gates, the outputs of at least two of said logic gates to the inputs of at least two of said logic gates, the outputs of at least three of said logic gates to the inputs of at least one logic gate, and the output of another logic gate to the input of still another logic gate; and first and second output terminals connected to the outputs of two of said logic gates respectively, said first and second output terminals providing true and complement outputs for said logic circuit.

7. A single multipurpose logic circuit for generating logical functions of three variables including:

a plurality of logic gates each having at least one input and one output;

a pair of output terminals;

interconnecting means interconnecting said gate inputs, gate outputs, and output terminals for generating at the output terminals at least 254 of 256 logical functions, said interconnecting means forming a plurality of circuit configurations wherein each of said logic gates are used in more than one of said configurations;

and signal transmission means for applying to each of said inputs either a constant bias level for selecting one of said configurations or a signal representing either the true value or the complement value of certain ones of said three variables.

8. A single multipurpose logic circuit as in claim 7 wherein the number of circuit configurations is less than ten.

9. A single multipurpose logic circuit as in claim 7 wherein the number of circuit configurations is equal to four.

References Cited

UNITED STATES PATENTS

| | | | |
|---|---|---|---|
| 3,028,088 | 4/1962 | Dunham | 235—164 |
| 3,196,284 | 7/1965 | Hunter | 307—88.5 |
| 3,201,574 | 8/1965 | Szekely | 235—175 |

OTHER REFERENCES

Hellerman, L.: A Catalog of Thru Variable Or-Invert and And-Invert Logical Circuits, IEEE Transactions, vol. EC–12.

Smith, R. A.: Minimal Three-Variable Nor and Nand Logic Circuits, IEEE Transactions, vol. EC–14, pp. 79–81, February 1965.

Richards, R. K.: Arithmetic Operations in Digital Computers, p. 159, February 1955.

MALCOLM A. MORRISON, *Primary Examiner.*

V. SIBER, *Assistant Examiner.*